(12) United States Patent
Siebeneick

(10) Patent No.: US 8,801,014 B2
(45) Date of Patent: Aug. 12, 2014

(54) REAR WHEEL SUSPENSION

(71) Applicant: GM Global Technology Operations LLC, Detroit, MI (US)

(72) Inventor: Juergen Siebeneick, Oberwesel (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/739,735

(22) Filed: Jan. 11, 2013

(65) Prior Publication Data

US 2013/0193662 A1 Aug. 1, 2013

(30) Foreign Application Priority Data

Jan. 12, 2012 (DE) .......................... 10 2012 000 422

(51) Int. Cl.
*B60G 3/00* (2006.01)

(52) U.S. Cl.
USPC .............................. 280/124.125; 280/124.128

(58) Field of Classification Search
USPC .................................... 280/124.125, 124.128
See application file for complete search history.

(56) References Cited

U.S. PATENT DOCUMENTS

| | | | |
|---|---|---|---|
| 4,109,979 A | 8/1978 | Estaque | |
| 6,357,793 B1 * | 3/2002 | Dickie et al. | 280/755 |
| 6,416,069 B1 * | 7/2002 | Ramsey | 280/124.116 |
| 8,356,839 B1 * | 1/2013 | Vey | 280/788 |
| 2004/0164513 A1 * | 8/2004 | Svartz et al. | 280/124.128 |
| 2005/0082783 A1 * | 4/2005 | Ramsey et al. | 280/124.128 |
| 2006/0181047 A1 * | 8/2006 | Chamberlin et al. | 280/124.128 |
| 2007/0145705 A1 * | 6/2007 | Ramsey et al. | 280/124.128 |
| 2007/0158924 A1 * | 7/2007 | Peaker et al. | 280/124.116 |
| 2008/0061619 A1 | 3/2008 | Bein et al. | |
| 2010/0230923 A1 * | 9/2010 | Vandenberg et al. | 280/124.128 |
| 2011/0089660 A1 * | 4/2011 | Dodd et al. | 280/124.128 |

FOREIGN PATENT DOCUMENTS

| | | |
|---|---|---|
| AT | 230687 T | 1/2003 |
| DE | 709250 C | 8/1941 |
| DE | 7146032 U | 4/1972 |
| DE | 2656799 A1 | 6/1977 |
| DE | 3825257 A1 | 2/1990 |
| DE | 19506413 A1 | 8/1996 |
| DE | 19654189 A1 | 8/1997 |
| DE | 19612885 A1 | 10/1997 |
| DE | 19933052 C1 | 11/2000 |
| DE | 69823446 T2 | 9/2004 |
| DE | 102006055295 A1 | 5/2008 |
| DE | 102009038909 A1 | 3/2011 |

OTHER PUBLICATIONS

German Patent Office, German Search Report for Application No. 10 2012 000 422.2 dated Sep. 18, 2012.

* cited by examiner

*Primary Examiner* — Toan To

(74) *Attorney, Agent, or Firm* — Ingrassia Fisher & Lorenz, P.C.

(57) ABSTRACT

A rear wheel suspension and a motor vehicle with such a rear wheel suspension are provided. The rear wheel suspension includes a wheel carrier configured for the rotatable bearing of a rear wheel, wherein the wheel carrier has at an end on a body side, a bearing for connection to a body with an axle, a bushing, and a base frame. The axle rests in the bushing. The axle is arranged on a bearing region of the wheel carrier, and the bushing rests in an aperture of the base frame.

15 Claims, 2 Drawing Sheets

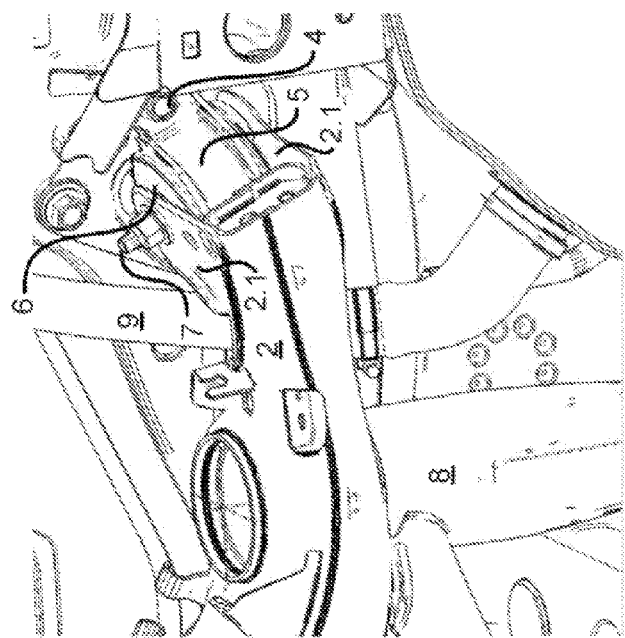
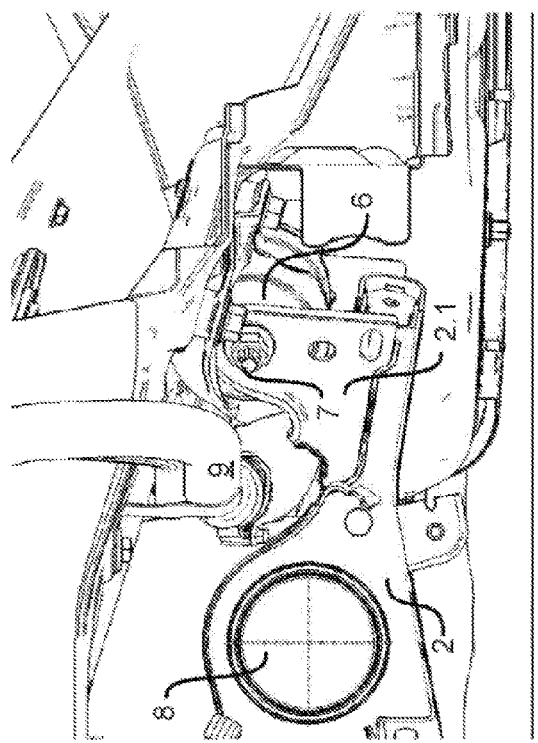
Fig. 3
Fig. 2

REAR WHEEL SUSPENSION

CROSS-REFERENCE TO RELATED APPLICATION

This application claims priority to German Patent Application No. 102012000422.2, filed Jan. 12, 2012, which is incorporated herein by reference in its entirety.

TECHNICAL FIELD

The technical field relates to a rear wheel suspension, in particular for an automobile, and a motor vehicle with such a rear wheel suspension.

BACKGROUND

From DE 195 06 413 A1 a rear wheel suspension is known with two trailing arms which are articulated on the body side. For this, an arm end surrounds a bushing which is penetrated by an axle which is arranged on a base frame which is connected to a body by means of screws. In order to enable movements of the arm end surrounding the bushing, the base frame has corresponding play to the bushing in the longitudinal and vertical direction of the vehicle. Also in a fuel duct which is not addressed in DE 195 06 413 A1, corresponding play to the arm ends surrounding the bushing must be provided.

It is at least one object herein to provide an improved motor vehicle. In addition, other objects, desirable features and characteristics will become apparent from the subsequent summary and detailed description, and the appended claims, taken in conjunction with the accompanying drawings and this background.

SUMMARY

According to an exemplary embodiment, a rear wheel suspension has at least one, in particular two, wheel carriers for the rotatable mounting in each case of at least one rear wheel. A wheel carrier can be, in particular, a trailing and/or semi-trailing arm, in particular a so-called C-arm. Two wheel carriers can be connected with one another by one or more, in particular torsion-flexible, crossmembers, in particular to a composite- or torsion crank axle. In an embodiment, the wheel carriers can rest on the body side in particular by means of a Watt or Panhard linkage.

In an embodiment, at least one wheel carrier has, at an end on the body side or respectively distant from the wheel, a bearing for connection to a body, which has an axle, a bushing and a base frame. This can be connected fixedly or detachably with a body, in particular by welding, soldering, adhesion, screwing, riveting or suchlike. In a preferred further development, the base frame can be arranged wholly or partially in a recess of the body, in particular of a longitudinal beam, in particular in a form-fitting, materially connected and/or frictionally engaged manner.

The axle can, in an embodiment, define a rotation axis of the wheel carrier against the body. Preferably the axle is, at least substantially, parallel to a rotation axis of the rear wheel. In a preferred embodiment, the axle can extend at least substantially in a plane which is parallel to a longitudinal and transverse axis of the vehicle. In this respect, an axle which is inclined against the rotation axis of the rear wheel can also be substantially parallel to a rotation axis of the rear wheel. In an embodiment, the axle forms an angle of between 0° and 30°, for example an angle of, at least substantially, 25°, with the longitudinal or transverse axis of the vehicle.

In an exemplary embodiment, the bushing is constructed elastically, in particular from one or more plastics and/or synthetic and/or natural rubber, in order in particular to enable slight translatory displacements of the axle against the body.

The single- or multiple-part axle rests in the bushing. In an embodiment, for this the axle engages through a through-opening in the bushing. The axle can be rotatably mounted on the bushing, for example by means of roll- or slide bearing. Likewise, the axle can also be rotatably secured on the bushing, for example in a form-fitting, frictionally engaged and/or materially connected manner, for example by shrink fitting, pressing in or suchlike. In a preferred embodiment, the axle is arranged in an axially secure manner on the bushing.

Furthermore, the axle is arranged on a bearing region of the wheel carrier. For example, the bearing region can have at least one, in particular two or more flanges, on or respectively between which the bushing is arranged with the axle and on which the axle is arranged. For this, the bearing region can have, in particular, an at least substantially U-shaped cross-section, the legs of which form the flanges. In another embodiment, the bearing region can also have a single flange on which the axle is arranged in an overhung manner, preferably on the outer or inner side of the vehicle. The bearing region, in particular the flange or flanges, can be securely connected with a wheel carrier base body, for example a C-arm or trailing arm, in particular integrally, in a frictionally engaged or materially connected manner, for instance by adhesion, welding, riveting or suchlike, or detachably, in particular by screwing.

The axle can be rotatably mounted on the bearing region, for example in the flanges, for example by means of roll or slide bearing. Likewise, the axle can also be rotatably secured on the bearing region, for example in a form-fitting, frictionally engaged and/or materially connected manner, for example by shrink fitting, pressing in or suchlike. In an exemplary embodiment, the axle has an external thread on at least one face side. This can be screwed with an internal thread in one of the flanges or a nut, in order to secure the axle axially and/or rotatably. In particular, the axle can be constructed as a screw or respectively screw bolt which is inserted from the inside and is then screwed from the outside and thus secures flange(s) and bushing rotatably in a force-fitting manner. Additionally or alternatively, the axle can have a shoulder or respectively end flange, in order to secure it axially on the bearing region. Generally, in a preferred embodiment the axle is arranged so as to be axially secure on the bearing region.

The bushing rests in an aperture of the base frame. This can completely or partially surround the bushing in a normal plane to the axle or respectively a cross-section perpendicularly to the axle. In particular for this, the base frame can be constructed in several parts, wherein two or more base frame parts can be connected detachably or non-detachably with one another, in particular in order to receive the bushing in a closed aperture. The bushing can be rotatably mounted in the aperture, in particular by means of roll or slide bearing. Likewise, the bushing can also be rotatably secured in the aperture, in particular in a form-fitting, frictionally engaged and/or materially connected manner, for example by shrink fitting, pressing in or suchlike. In a preferred embodiment, the bushing is arranged so as to be axially secure in the aperture.

By a rotatable bearing of the bushing in the support and/or the axle in the bushing and/or on the bearing region of the wheel carrier, a rigid body rotational degree of freedom of the wheel carrier against the body can be presented. An elastic rotational degree of freedom about the axle, about a tilting axis perpendicular hereto and/or in translatory direction, in particular in the longitudinal, transverse and/or vertical direction of the vehicle, can be provided in particular by an elastic bushing.

In particular for the roll or slide bearing of the axle in the bushing and/or of the bushing in the aperture, the bushing can have two or more bushing parts which are mounted rotatably with respect to one another, for example an outer and inner ring of a roll bearing or an outer periphery and inner periphery contacting this of a slide bearing. An elasticity can be presented in one or more bushing parts, in particular of one or more plastics and/or synthetic and/or natural rubber.

The bearing therefore constitutes an inversion of the known bearing arrangement: in this, the trailing arm end surrounds the bushing, so that on the one hand corresponding play must be kept free between the trailing arm end and the base frame, and on the other hand a movement of the trailing arm end under elastic deformation of the bushing competes against a favorable fuel duct guidance. According to the aspect described above, the bushing, which rests in the aperture, remains on the other hand substantially stationary against the body, so that advantageously in particular a duct, in particular a fuel duct, can be directed past more closely.

Accordingly, provision is made in a preferred embodiment that one or more ducts, in particular at least one fuel duct, is directed past the base frame. Directing past the base frame is understood in particular to mean that no components are provided between the duct and the base frame and/or the duct is immediately adjacent to the base frame, in particular touches the base frame or has a distance therefrom which corresponds preferably to at most three times a diameter of the duct, in particular at most twice a diameter of the duct and preferably at most the diameter of the duct. In particular, a duct can be fastened on the base frame or adjacent thereto on the body, wherein in this region the duct can preferably be, at least substantially, oriented parallel to the axle. In a preferred embodiment, a duct is directed between the base frame and a crossmember which is connected with the wheel carrier.

BRIEF DESCRIPTION OF THE DRAWINGS

The various embodiments will hereinafter be described in conjunction with the following drawing figures, wherein like numerals denote like elements, and wherein:

FIG. 2 is a perspective lateral view of a portion of the rear wheel suspension of FIG. 1; and FIG. 3 is a perspective bottom view of the portion of the rear wheel suspension of FIG. 2.

DETAILED DESCRIPTION

Figure 1:
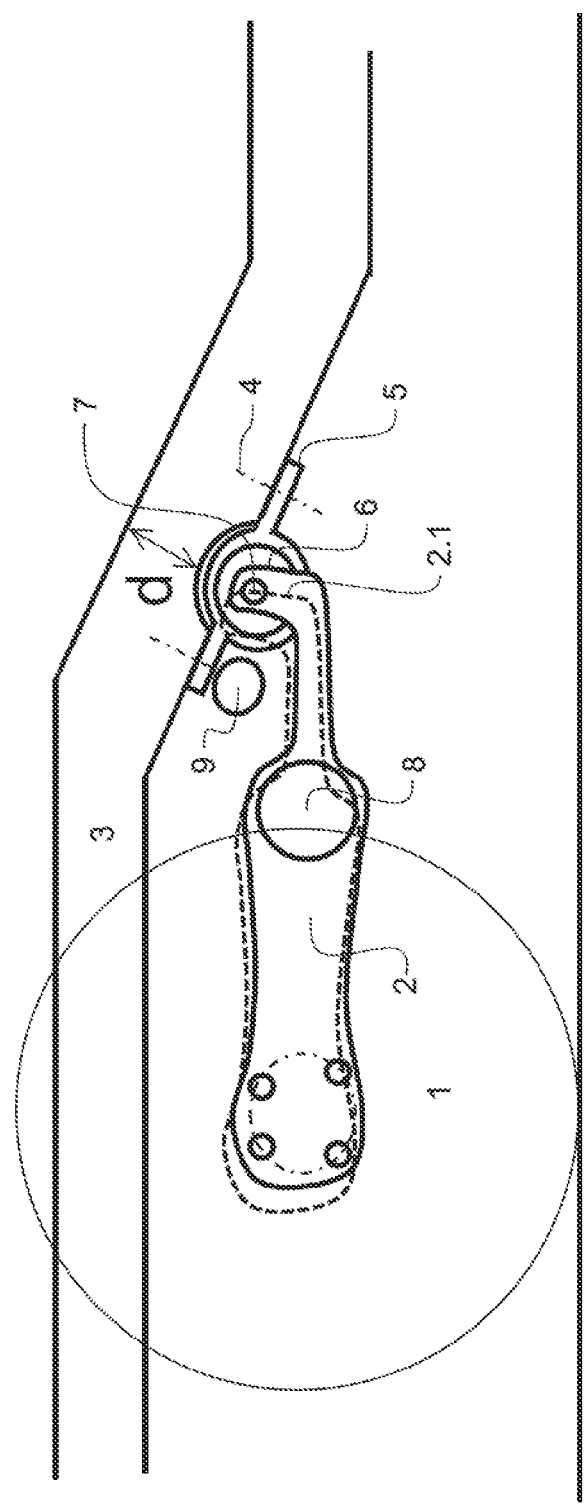
FIG. 1 is a side cross-sectional view of a rear wheel suspension of an automobile according to an exemplary embodiment.

The following detailed description is merely exemplary in nature and is not intended to limit the various embodiments or the application and uses thereof. Furthermore, there is no intention to be bound by any theory presented in the preceding background or the following detailed description.

FIGS. 1 to 3 show in partially diagrammatic lateral or respectively perspective views a rear wheel suspension of an automobile according to an exemplary embodiment.

It comprises two structurally identical wheel carriers in the form of C-arms 2, only one of which is shown in the figures, and on which respectively a rear wheel 1 is rotatably mounted. Both wheel carriers 2 are connected with one another by a torsion-flexible crossmember 8 and are respectively articulatedly connected via a bearing onto an oblique longitudinal beam of a body rear frame 3.

The bearing has a base frame 5 which is constructed substantially in a ring shape, so that it completely surrounds a circular aperture.

In an embodiment, on the outer side, the base frame 5 has two aligned flanges, which divide the ring-shaped outer periphery into two sections. An upper of these sections is arranged in a form-fitting manner in a recess in the oblique longitudinal beam of the body rear frame 3. The base frame 5 is fastened on the oblique longitudinal beam of the body rear frame 3 by screws 4 which penetrate its flanges.

In the circular aperture, a ring-shaped elastic rubber and/or plastic bushing 6 is received, so that it rests in radial and axial direction in the aperture, in an embodiment. The bushing can be secured in particular in a frictionally engaged, form-fitting and/or materially connected manner axially and/or radially in the aperture. For example, the bushing can be pressed into the aperture of the base frame or respectively the base frame can be shrink-fitted onto the bushing. Likewise, the base frame can be composed in several parts, wherein on assembly the bushing 6 is surrounded.

The wheel carrier 2 has at its end on the body side, distant from the wheel (on the right in FIGS. 1 to 3) a bearing region 2.1 with a U-shaped cross-section. The two U-legs are formed by flanges which in the example embodiment are welded with the C-arm 2. The bushing 6 is received between the two flanges of the bearing region 2.1; these can secure the bushing 6 in a form-fitting manner in particular in axial direction.

An axle 7 penetrates the flanges of the bearing region 2.1 and the bushing 6 received between them, and is rotatably mounted with slide bearing in the bushing 6 and/or the flanges. As can be seen in particular in FIG. 2, 3, the axle 7 is axially secured at least on one side by a nut. On the opposite side, the axle 7 can have a shoulder or respectively flange or a further nut.

The wheel carrier 2 can therefore pivot about the longitudinal axis of the axle 7 against the body 3. In addition, it can move and/or tilt against the body 3 under elastic deformation of the bushing 6, which is indicated by dashed lines in FIG. 1. The bushing 6 remains here stationary in the aperture of the base frame 5, which is secured to the body. Therefore, a fuel duct 9 can be directed directly past the base frame 5.

Also, no free space has to be provided in the oblique longitudinal beam of the body rear frame 3 for the movement of a wheel carrier end encompassing the bushing 6. Therefore, the wall thickness d can be greater in this region, which increases the rigidity and strength of the body 3. In addition, the bearing can be arranged higher (upwards in FIG. 1), which improves the driving dynamics and the comfort.

In an embodiment, the base frame 5 completely surrounds the bushing 6 in a normal plane to the axle 7 (plane of the drawing of FIG. 1).

Although example embodiments have been explained in the preceding description, it is pointed out that a plurality of modifications are possible. In addition, it is pointed out that the example embodiments are merely examples which are not intended to restrict the scope of protection, the applications and the structure in any way. Rather, through the preceding description the specialist in the art is given a guideline for the implementation of at least one example embodiment, wherein various amendments, in particular with regard to the function and arrangement of the described components, can be carried out, without departing from the scope of protection, as can be seen from the claims and combinations of features equivalent thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A rear wheel suspension comprising:
    a wheel carrier configured for a rotatable bearing of a rear wheel, wherein the wheel carrier has at an end on a body side:
        a bearing for connection to a body with an axle;
        a bushing;
        a base frame, wherein the axle rests in the bush, and wherein the axle is arranged on a bearing region of the wheel carrier, and the bush rests in an aperture of the base frame; and
        a duct fastened on the base frame.

2. The rear wheel suspension according to claim 1, wherein the rear wheel suspension is for an automobile.

3. The rear wheel suspension according to claim 1, wherein the bearing region has two flanges between which the bushing is arranged and on which the axle is arranged.

4. The rear wheel suspension according to claim 1, wherein the axle is rotatably mounted on the bearing region and/or the bushing or is torsionally rigid.

5. The rear wheel suspension according to claim 1, wherein the bushing is rotatably mounted in the aperture or is torsionally rigid.

6. The rear wheel suspension according to claim 1, wherein the bushing has at least two bushing parts, which are mounted rotatably with respect to one another.

7. The rear wheel suspension according to claim 1, wherein the base frame surrounds the bushing, at least partially, in a normal plane to the axle.

8. The rear wheel suspension according to claim 7, wherein the bushing rests in a frictionally engaged and/or form-fitting manner in the aperture.

9. The rear wheel suspension according to claim 1, wherein the bushing is constructed so as to be elastic.

10. A motor vehicle with a rear wheel suspension comprising:
    a body defining a recess;
    a wheel carrier configured for a rotatable bearing of a rear wheel, wherein the wheel carrier has at an end on a body side:
        a bearing for connection to a body with an axle;
        a bushing; and
        a base frame disposed at least partially within the recess, wherein the axle rests in the bushing, and wherein the axle is arranged on a bearing region of the wheel carrier, and the bushing rests in a recess of the base frame, and wherein the base frame is connected with the body.

11. The motor vehicle according to claim 10, wherein the motor vehicle is an automobile.

12. The motor vehicle according to claim 10, wherein the body comprises a longitudinal beam.

13. The motor vehicle according to claim 10, wherein a duct is directed past the base frame.

14. The motor vehicle according to claim 13, wherein the duct is a fuel duct.

15. The motor vehicle according to claim 13, wherein the duct is fastened on the base frame or adjacent thereto on the body.

\* \* \* \* \*